United States Patent Office 2,938,916
Patented May 31, 1960

2,938,916

ZINC SALTS OF STEROID PHOSPHATES

Burton G. Christensen, Rahway, and Ralph F. Hirschmann, Scotch Plains, N.J., assignors to Merck & Co., Inc., Rahway, N.J., a corporation of New Jersey No Drawing. Filed July 30, 1957, Ser. No. 675,001

1 Claim. (Cl. 260—397.45)

This invention relates to the water-insoluble zinc salts of steroid-21-dihydrogen phosphate esters, having cortisone-like, anti-inflammatory activity and to processes for preparing the same.

The compounds of the present invention are zinc salts of steroid-21-dihydrogen esters, which have a probable general formula of the group consisting of

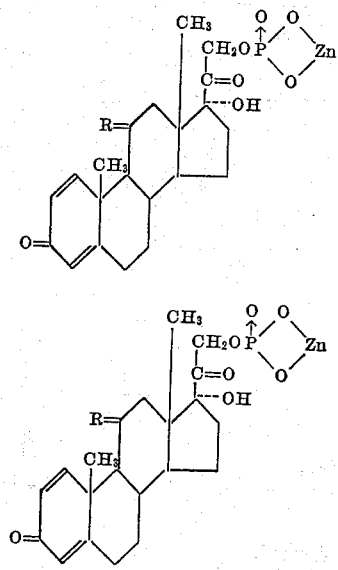

and the therapeutically active nuclear substituted derivatives thereof, where R is either β-hydroxyl

or keto (O=).

The compounds of this invention may be either unsubstituted compounds conforming to one of the above formulas or compounds conforming to one of the above formulas except for the presence of one or more substituents which either enhance or do not destroy therapeutic activity. Among the substituents which may be present are a double bond in addition to those shown, as for example at the 6(7) position, and substituent elements and radicals such as 2α-methyl, 6α-methyl, 6β-methyl, 9α-halo (e.g. 9α-fluoro or 9α-chloro), 16α-methyl, and 16α-hydroxy.

Among the compounds which may be prepared according to the present invention are prednisolone-21-phosphate zinc salt, prednisone-21-phosphate zinc salt, hydrocortisone-21-phosphate zinc salt, 9α-fluorohydrocortisone-21-phosphate zinc salt, 6α-methylprednisone-21-phosphate zinc salt, 16α-methylprednisolone-21-phosphate zinc salt, 9α-fluoro-16α-hydroxyprednisolone-21-phosphate zinc salt, $\Delta^{4,6}$-pregnadiene-11β,17α,21-triol-3,20-dione-21-phosphate zinc salt, $\Delta^{1,4,6}$-pregnatriene-11β,17α,21-triol-3,20-dione-21-phosphate zinc salt, and the like.

The compounds of the present invention are useful as anti-inflammatory agents which are suitable for oral administration and as ingredients in ointments for topical application. These compounds are also useful as chemical intermediates in the recovery of steroid phosphates from aqueous solution without evaporation of water. For example, these compounds are useful as chemical intermediates in the preparation of steroid-21-dihydrogen phosphate esters such as prednisolone-21-dihydrogen phosphate from solutions of the esters in impure form contaminated with inorganic material.

A convenient starting material for preparing the compounds of the present invention is an aqueous solution of the corresponding 21-dihydrogen phosphate ester or a water-soluble salt thereof. For example, where the desired product is prednisolone-21-phosphate zinc salt, an aqueous solution of prednisolone-21-dihydrogen phosphate or a solution of prednisolone-21-hydrogen phosphate silver salt may serve as the starting material. This solution may contain inorganic ions, such as chloride, acetate, and nitrate, which will not coprecipitate with the metal steroid phosphate salt. However, the solution of the starting material must be free of ions such as phosphate which will coprecipitate with the metal steroid phosphate.

The starting materials for the present invention can be prepared from the corresponding alcohols such as cortisone, hydrocortisone, prednisolone, and the like. One method for producing 21-dihydrogen phosphate esters of steroids from the corresponding alcohols consists in reacting the alcohol with methanesulfonyl chloride to produce the corresponding 21-methanesulfonate, reacting this compound with an alkali metal iodide to produce the corresponding 21-iodo compound, reacting this 21-iodo compound with silver dihydrogen phosphate to produce the 21-dihydrogen phosphate ester in solution contaminated with inorganic phosphate ions and removing the inorganic phosphate ions by treatment with either an anion exchange resin or with silver nitrate. This synthesis, using the conversion of prednisolone to $\Delta^{1,4}$-pregnadiene-11β,17α,21-triol-3,20-dione-21-dihydrogen phosphate as an example, may be illustrated by the following equation:

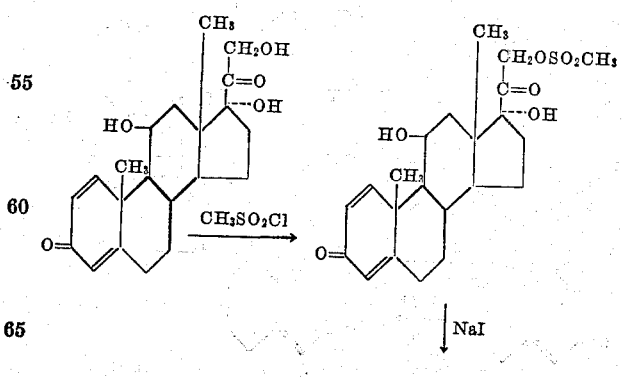

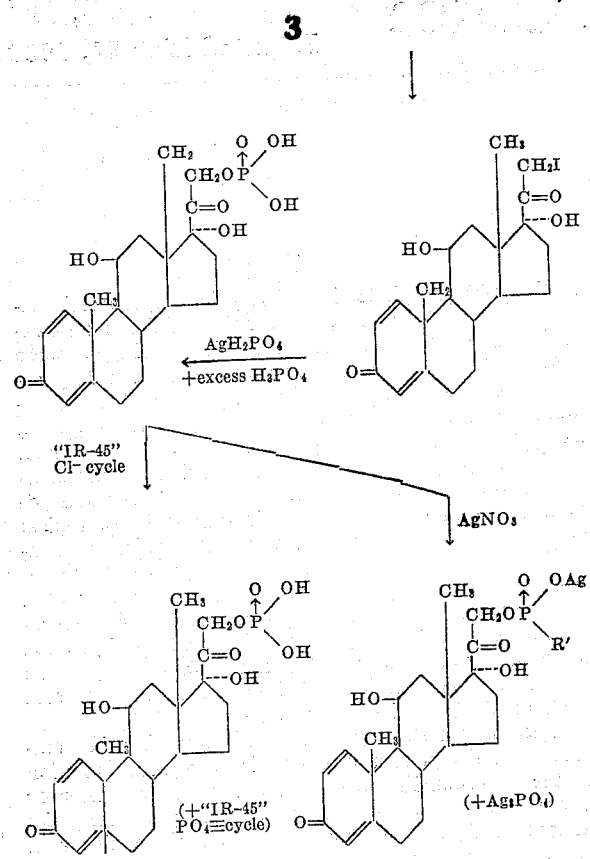

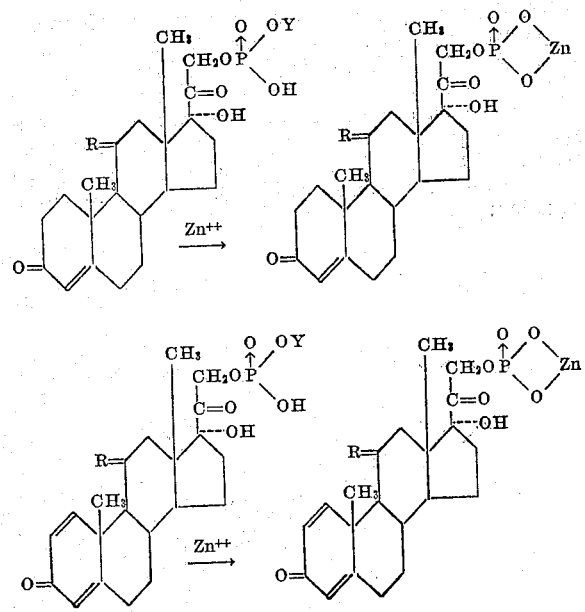

where R' is hydrogen or silver. This synthesis forms no part of the present invention and is described more fully in the copending application of Ralph F. Hirschmann, Burton G. Christensen, and Irving Putter, Serial No. 674,999, filed on even date, entitled "Purification of Steroid 21-dihydrogen Phosphates."

According to the present invention an aqueous solution of a steroid-21-dihydrogen phosphate ester or water-soluble salt thereof, which may be prepared either as described above or by other methods, is reacted with a water-soluble zinc salt, such as zinc acetate, zinc chloride, or the like, to precipitate the corresponding zinc steroid phosphate. The precipitation of the steroid phosphate zinc salt may be represented by the following equation:

In the above equation Y is selected from the group consisting of hydrogen and metals which form water-soluble steroid 21-hydrogen phosphate salts.

A preferred salt which may be formed according to the present invention is prednisolone-21-phosphate zinc salt. This compound is useful as an anti-inflammatory agent for oral administration, and as an ingredient in ointments for topical application. It has also been found to be of outstanding value as an intermediate in the preparation of pure prednisolone-21-dihydrogen phosphate, due to the fact that it precipitates quantitatively from solutions containing prednisolone-21-dihydrogen phosphate mixed with inorganic material, and at the same time may be converted quantitatively to pure prednisolone-21-dihydrogen phosphate.

Prednisolone-21-phosphate zinc salt is best prepared by reaction of an aqueous solution of prednisolone-21-dihydrogen phosphate, which may also contain inorganic chloride, nitrate, or acetate, or the like, with zinc acetate according to the following equation:

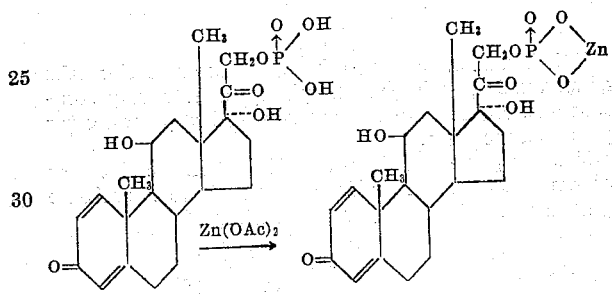

While the probable structural formula of prednisolone-21-dihydrogen phosphate zinc salt is as indicated above, it is possible that the acid salt having the probable formula

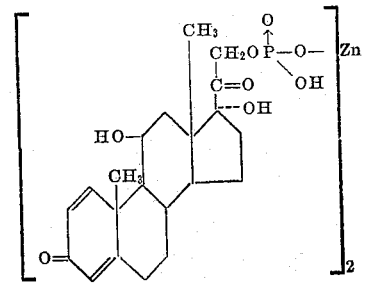

may also be formed.

The precipitation of the steroid phosphate zinc salt according to the present invention may be carried out conveniently at room temperature, although elevated temperatures are also permissible. After the precipitation has taken place, it is frequently desirable to heat the slurry to increase the particle size of the precipitate. The precipitate is recovered by conventional means such as centrifugation or filtration.

The steroid phosphate zinc salts formed according to the present invention may be converted to the corresponding steroid-21-dihydrogen phosphate by reaction with a suitable acidification agent. A strongly acidic ion-exchange resin, such as "Amberlite IR-120," made by Rohm and Haas Co., Philadelphia, Pa., is used to form the dihydrogen phosphate acid esters. It is understood that other strongly acidic ion-exchange resins in the hydrogen form may also be used. The steroid 21-dihydrogen phosphate may then be converted to a corresponding alkali metal salt, such as the monosodium or disodium salt. This reaction is illustrated in the equation below with respect to the conversion of prednisolone-21-phosphate zinc salt to prednisolone-21-dihydrogen phosphate and the monosodium salt:

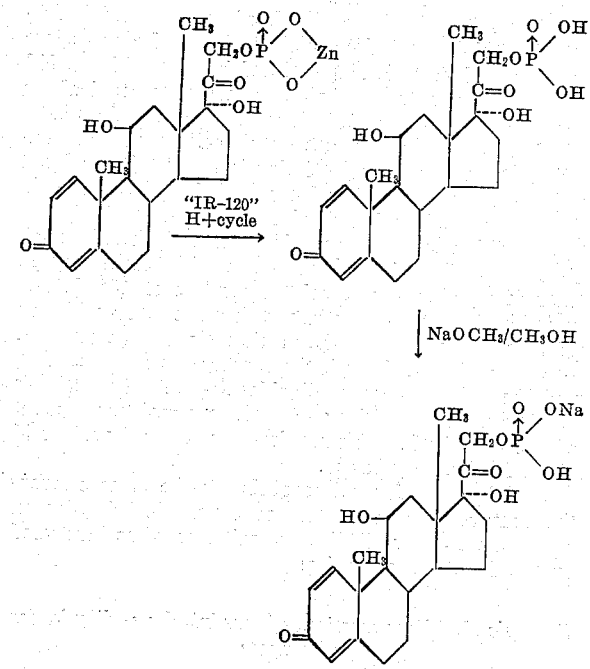

The conversion to the sodium salt is preferably effected with sodium methoxide in a suitable anhydrous organic solvent such as the lower aliphatic alcohols and particularly methanol. The final pH of the monosodium salt is about 5.2 to 5.5. Where the disodium salt is desired, the prednisolone-21-dihydrogen phosphate is neutralized to a pH of about 9.2 to 9.6. The sodium salt may be recovered from the reaction medium by suitable means such as precipitation with ether.

A typical procedure for preparing the steroid 21-dihydrogen phosphate esters which constitute the starting materials for the present invention is illustrated in detail below with reference to the conversion of prednisolone to prednisolone-21-dihydrogen phosphate.

PREPARATION OF PREDNISOLONE 21-METHANESULFONATE

Seventy liters of dry pyridine and 7.5 kg. of prednisolone are charged to a 30-gallon jacketed glass-lined still. The mixture is agitated until complete solution is obtained. About 40 liters of pyridine are distilled at high vacuum while maintaining the batch temperature below 40° C. The solution is cooled to 0° C., and 212 liters of methanesulfonyl chloride are charged. The batch temperature is maintained between 0° and +3° C. during charging of the methanesulfonyl chloride. An atmosphere of flowing nitrogen is maintained in the still, and the mixture is agitated during the last stages of the addition. The mixture is then aged for one hour, and 15 gallons of ice water are added cautiously to the still while maintaining the temperature between 0° and 5° C. The still contents are then transferred to a jacketed kettle equipped with an agitator, and 62 kg. of cracked ice in 15 gallons of deionized water are added. The batch is aged one hour and a solution of 2 liters of concentrated (37%) hydrochloric acid in 4 gallons of deionized water is added. The batch is centrifuged and the centrifuge cake washed free of pyridine with deionized water. The centrifuge cake is then vacuum-dried at 50° C. to a moisture content of about 1%, which requires about three days of drying. Yield about 7.77 kg. (92%).

PREDNISOLONE 21-IODIDE

To a 30-gallon jacketed glass-lined still 64.5 lbs. (31.0) liters of dimethylformamide are charged by vacuum. The still contents are agitated as 7.74 kg. of dry (less than 1% moisture) prednisolone-21-methane-sulfonate are charged. Then 4.02 kg. of sodium iodide are charged. The still contents are heated to 57° to 60° C. by means of a steam jacket and held at this temperature for 30 minutes. The batch is cooled to 35° C. and 12 gallons of deionized water are added at the rate of about one gallon per minute. In the event the solution becomes cloudy, addition of water is interrupted and the mixture agitated for five minutes before resumption of water addition. After all of the water is added, the batch is transferred to a 50-gallon kettle equipped with agitator and an additional 16.7 gallons of deionized water are added. The batch is cooled to 0° to 5° C. and aged for one hour. The batch is filtered and the filter cake washed and vacuum-dried at 30° to 35° C. to a moisture content of less than 1%. Yield about 7.95 kg. (96%).

PREPARATION OF SILVER DIHYDROGEN PHOSPHATE

To a 100-gallon jacketed glass-lined still, 216 liters of deionized water and 38.6 kg. of monobasic sodium phosphate are charged. The charge is heated at 60° to 70° C. until complete solution is obtained. A solution of 18.0 kg. of silver nitrate in 90 liters of water is added. The batch is aged for one hour at 60° to 70° C., cooled to 30° C. and filtered. The filter cake is washed five times with 5 gallons of deionized water, and air-dried on stainless steel trays at 60° C., to a moisture content to 0.5%. The approximate yield of trisilver phosphate is 12.5 kg. (85%).

To a 5-gallon stainless steel mixing bowl of a Hobart blender, 4.87 liters of 85% phosphoric acid and 11.75 kg. of trisilver phosphate are added with gentle agitation. The mixing bowl is cooled with cracked ice during the addition. The agitator speed is increased, and the slurry is agitated for 15 minutes. Then 300 ml. of acetonitrile are added and the mixture agitated for five additional minutes. The slurry is then passed twice through a colloid mill and 4.7 liters of acetonitrile are added to the slurry prior to the second pass. This results in finely divided silver dihydrogen phosphate.

PREPARATION OF PREDNISOLONE DIHYDROGEN PHOSPHATE

The slurry of silver dihydrogen phosphate prepared as described above and an additional 64.7 liters of acetonitrile are charged to a 50-gallon, jacketed, stainless steel still equipped with 120-r.p.m. turbine impeller. The charge is agitated and an atmosphere of flowing nitrogen is maintained in the still. Then 7 kg. of prednisolone-21-iodide and 1.5 kg. of a diatomaceous earth filter aid are charged to the still, and the contents are heated to gentle reflux (about 84° C.) for three and one-fourth hours. The vapor riser of the still is water-cooled during reflux. The batch is cooled to 30° C. and 30 kg. of cracked ice and 20 liters of water are added. The batch is transferred to a 100-gallon jacketed kettle equipped with an agitator. The still is rinsed with three 5-liter portions of water which are added to the kettle. The pH is adjusted to a value in the range of 6 to 6.5 by the addition of sodium hydroxide solution, while maintaining the batch temperature below 20° C. The batch is then transferred to a 50-gallon stainless steel still and the kettle washed with two 2-liter portions of water which are added to the batch. The acetonitrile is vacuum-evaporated at 30 mm. of mercury and a batch temperature below 30° C. Water at 60° C. is circulated through the jacket of the still to maintain the batch temperature. The end point of the concentration is indicated by a rise in internal temperature, slowing of the distillation rate, and an increase in foaming. When the concentration is completed, any silver compound on the side of the still is scraped down and the pH of the batch adjusted to within the range of 6.8 to 7 by adding 34% sodium hydroxide solution while the temperature is maintained below 20° C. The batch is stirred for two hours and readjusted to pH 6.8 to 7. The batch is filtered on a 32-inch ceramic pot connected to a vacuum trap. The filter cake, which is essentially silver iodide, is sucked dry, washed with 10 liters of deionized water, transferred to a kettle, and slurried with 30 liters of deionized water. The slurry is refiltered and the filter cake washed with 30 liters of water three additional times, and the filter cake is collected after the last filtration. The filtrates are combined in a 100-gallon glass-lined kettle.

The solution of prednisolone-21-dihydrogen phosphate, prepared as above described, is contaminated with inorganic phosphate. This solution is then treated as follows to remove the inorganic phosphate.

REMOVAL OF INORGANIC PHOSPHATE WITH ION EXCHANGE RESIN

To the combined filtrates of prednisolone-21-dihydrogen phosphate containing inorganic phosphate, prepared as described above, enough concentrated hydrochloric acid is added to adjust the pH to 4.8 to 4.9. This requires about 3.5 liters. The batch is filtered, and the filter cake washed with two 2-liter portions of water which are added to the filtrate. One-half of the filtrate is charged to a column containing 33 gallons of "Amberlite IR-45" ion-exchange resin on the chloride cycle. The discharge rate from the column is adjusted to 3 liters per minute. Approximately the first 20 liters of the effluent are discarded. The effluent is then spot-checked with an ultraviolet scanner until a positive ultra-violet test is obtained. At this point the effluent flow is collected in a 150-gallon kettle and 30 gallons are collected therein. Then the next 5 gallons are collected in a carboy and 10 additional gallons in a second carboy. The contents of these two carboys are added to the kettle, provided they contain at least 1 mg./ml. of steroid as shown by ultra-violet absorption. The other half of the filtrate is charged to a second column of "IR-45" and collected in the same manner as the first half. The effluent is prednisolone dihydrogen phosphate free of inorganic phosphate ions.

Instead of removing the inorganic phosphate with an ion-exchange resin, the inorganic phosphate may be removed with silver nitrate as follows:

PRECIPITATION OF INORGANIC PHOSPHATE WITH SILVER NITRATE

To an aqueous solution having a volume of 240 ml. and containing 9.68 mg./ml. of prednisolone-21-dihydrogen phosphate was added 20.72 ml. (10% excess) of silver nitrate dissolved in 20 ml. of water with stirring. A precipitate was formed. The suspension was allowed to stand for one hour, and the precipitate was then filtered and washed. The filtrate was collected for further treatment to recover pure prednisolone-21-dihydrogen phosphate.

The effluent from the resin column as described above, or the filtrate from the treatment with the silver salt as described in the preceding paragraph, is then reacted with a zinc salt according to the present invention as illustrated in the following example:

Example 1.—Preparation of zinc prednisolone phosphate

A sample of the effluent from the resin column in the above described procedure is assayed by ultraviolet to determine steroid content. The effluent is adjusted to pH 5 to 5.2 with about 50 ml. of concentrated hydrochloric acid. A solution of about 3 kg. of zinc acetate in 8 liters of water is prepared and heated to 70° to 75° C. The exact amount of zinc acetate is two equivalents per equivalent of prednisolone dihydrogen phosphate, which corresponds to about equal weights of both materials. The zinc acetate solution is added to the effluent with agitation over a 10-minute period, which results in immediate precipitation of zinc prednisolone phosphate. This addition is carried out in a steam jacketed vessel. When the addition is complete the vessel is heated through the steam jacket to internal temperature of 60° C. and maintained at this temperature for one hour with the agitator off to increase the particle size of the product. The batch is centrifuged, the mother liquors discarded, and the cake washed until chloride-free. The cake is dried in a vacuum drier at 60° C. to a moisture content of less than 10%. This requires over three days. Yield about 3.2 kg. (dry basis).

The zinc salts formed according to the present invention may be converted to the pure steroid-21-dihydrogen phosphate ester or alkali metal salt thereof as illustrated by the following examples:

Example 2.—Regeneration of prednisolone dihydrogen phosphate

To a 100-gallon still 66.7 liters (116 lbs.) of dry methanol are charged, then 36 liters of ion exchange resin "Amberlite IR-120" on the hydrogen cycle and 3.2 kg. of zinc prednisolone phosphate are charged to the still. The batch is agitated for two hours at 20° to 30° C. Then 400 g. of decolorizing charcoal are added to the batch which is stirred for 30 minutes. The batch is filtered and the filtrate washed with methanol until the cake is substantially free of steroid as shown by an ultaviolet scanner. The filtrate is then recharged to the still. The filtrate is prednisolone dihydrogen phosphate.

Example 3.—Preparation of monosodium prednisolone hydrogen phosphate

Fifty liters of methanol are charged to a 20-gallon still. One pound of freshly-opened sodium methoxide is added and the contents agitated under a nitrogen atmosphere until solution is complete. The filtrate from Example 2 is titrated with this sodium methoxide solution to a pH of 5.2 to 5.5, which requires about 30 to 40 liters of sodium methoxide soultion. The batch is concentrated to less than 15 liters under vacuum of 29 inches of mercury and batch temperature below 30° C. The concentration is carried out in a 100-gallon still having a jacket surrounding the still pot. Atmospheric steam is circulated through this jacket until the volume of the batch is about 15 gallons; then water at 60° C. is circulated through the jacket. After concentration 360 lbs. of anhydrous ether are added to the batch which is aged for one hour at 15° to 25° C. in a flowing nitrogen atmosphere. The slurry is filtered, and air is excluded during filtration. The still and the filter cake are washed with two 6-liter portions of ether which are added to the filtrate. The filter cake is vacuum dried on stainless steel trays at 25° to 30° C. Approximate yield 2.55 kg. (about 35% on dry basis).

While the present invention has been described in detail with reference to various specific embodiments thereof, it is understood that the scope of this invention is to be measured only by the scope of the appended claim.

We claim:
A compound having a formula selected from the group consisting of
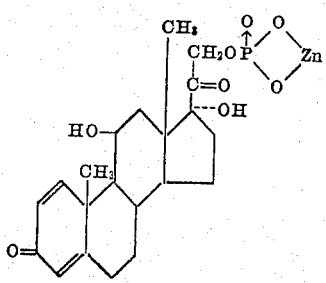
and
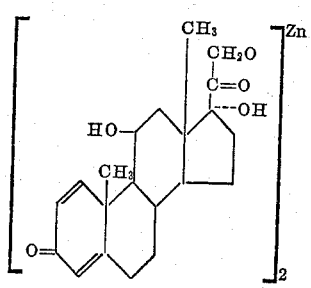
References Cited in the file of this patent
UNITED STATES PATENTS
2,779,775    Sarett ------------------ Jan. 29, 1957
2,789,117    Sarett ------------------ Apr. 16, 1957